United States Patent
Morrison et al.

(10) Patent No.: US 8,357,323 B2
(45) Date of Patent: Jan. 22, 2013

(54) CERAMIC MATRIX COMPOSITE WALL WITH POST LAMINATE STITCHING

(75) Inventors: Jay A. Morrison, Oviedo, FL (US); Jay E. Lane, Mooresville, IN (US)

(73) Assignee: Siemens Energy, Inc., Orlando, FL (US)

( * ) Notice: Subject to any disclaimer, the term of this patent is extended or adjusted under 35 U.S.C. 154(b) by 454 days.

(21) Appl. No.: 12/174,243

(22) Filed: Jul. 16, 2008

(65) Prior Publication Data

US 2010/0015394 A1     Jan. 21, 2010

(51) Int. Cl.
 *B32B 37/00* (2006.01)
 *B29C 70/00* (2006.01)
(52) U.S. Cl. ........ 264/258; 264/640; 264/642; 501/95.1
(58) Field of Classification Search ............ 264/642, 264/257, 258
 See application file for complete search history.

(56) References Cited

U.S. PATENT DOCUMENTS

| | | | |
|---|---|---|---|
| 4,522,673 A * | 6/1985 | Fell et al. .................. | 156/307.3 |
| 4,568,594 A | 2/1986 | Hordonneau et al. | |
| 4,888,311 A | 12/1989 | Davidovits et al. | |
| 4,921,822 A | 5/1990 | Luthra | |
| 5,077,243 A | 12/1991 | Nakano et al. | |
| 5,160,471 A * | 11/1992 | Vives et al. .................. | 264/136 |
| 5,294,387 A | 3/1994 | Nakano et al. | |
| 5,306,554 A | 4/1994 | Harrison et al. | |
| 5,308,228 A * | 5/1994 | Benoit et al. .................. | 416/230 |
| 5,460,637 A | 10/1995 | Connolly et al. | |
| 5,591,933 A * | 1/1997 | Li et al. .................. | 89/36.02 |
| 5,624,622 A * | 4/1997 | Boyce et al. .................. | 264/258 |
| 7,247,003 B2 | 7/2007 | Burke et al. | |
| 7,300,621 B2 | 11/2007 | Merrill | |
| 7,600,978 B2 * | 10/2009 | Vance et al. .................. | 416/230 |
| 2004/0195718 A1 * | 10/2004 | Obrachta et al. .............. | 264/156 |
| 2005/0017389 A1 * | 1/2005 | Petervary et al. .............. | 264/41 |
| 2006/0120874 A1 * | 6/2006 | Burke et al. .............. | 416/229 R |
| 2006/0211564 A1 * | 9/2006 | Merrill .................. | 501/95.2 |
| 2008/0025846 A1 * | 1/2008 | Vance et al. .................. | 416/233 |

* cited by examiner

*Primary Examiner* — Matthew Daniels
*Assistant Examiner* — Erin Snelting

(57) ABSTRACT

A stitching geometry and method for selective interlaminar reinforcement of a CMC wall (20A). The CMC wall is formed of ceramic fiber layers (22) individually infused with a ceramic matrix, stacked, and at least partially cured. A row of holes is formed in the wall, and a ceramic fiber thread (25) is infused with a wet ceramic matrix and passed through the holes to form stitches (28, 30, 31). The stitches are then cured, causing them to shrink more than any remaining wall shrinkage, thus tensioning the stitches and compressing the wall laminae together. The stitches may have through-wall portions (30, 31) that are angled differently in different wall areas as a function of interlaminar shear over interlaminar tension, optimizing wall reinforcement locally depending on magnitude and direction of shear. Alternate rows of stitches (54, 56) may have offsets in a stitch direction (34) and/or different through-wall angles (A1, A2).

13 Claims, 5 Drawing Sheets

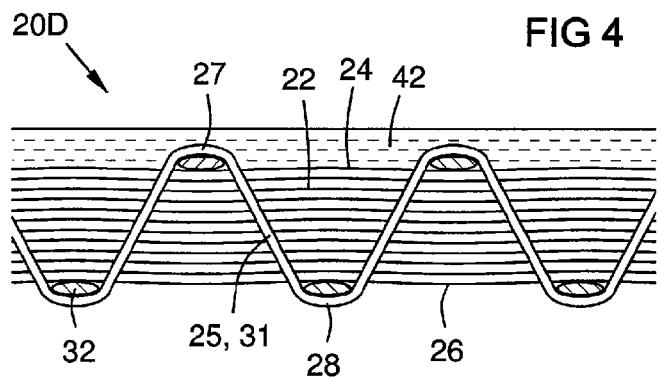
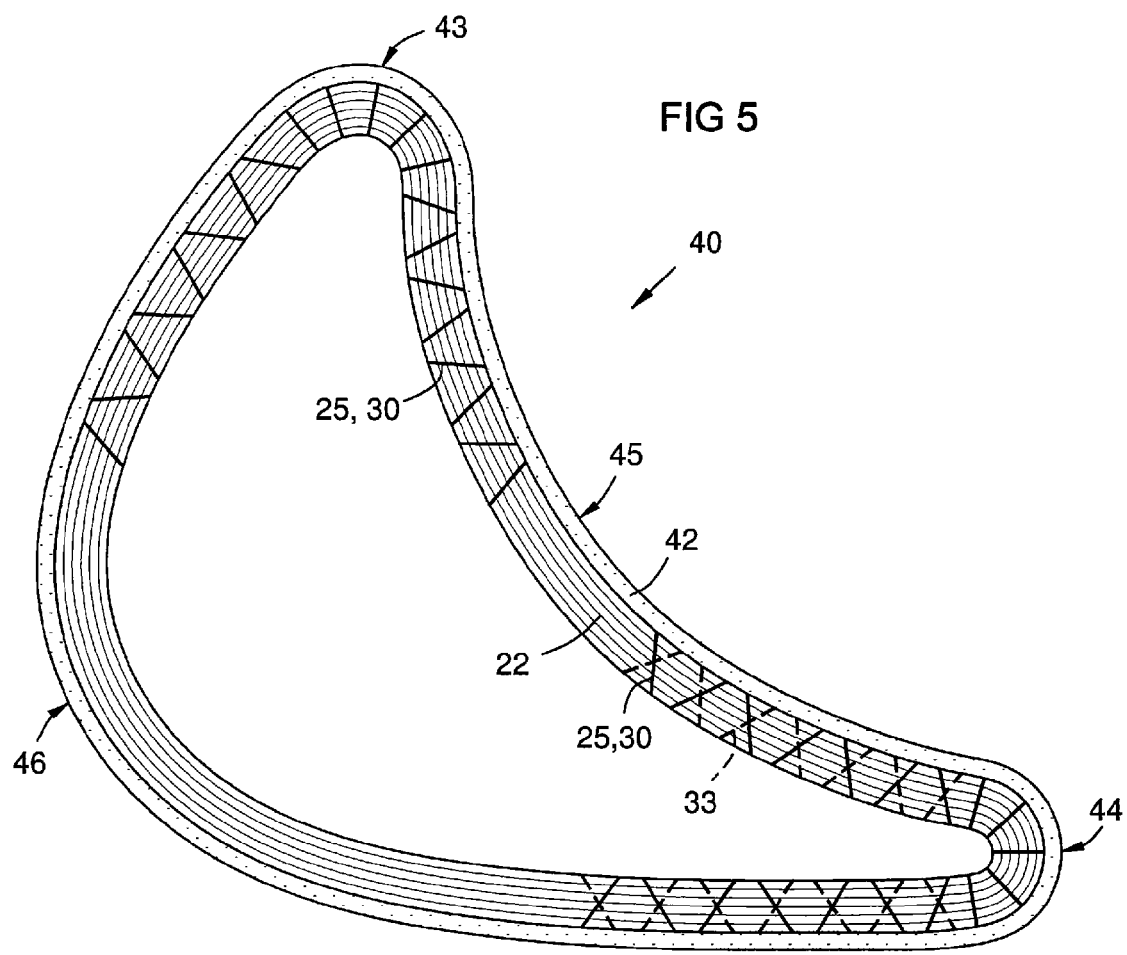

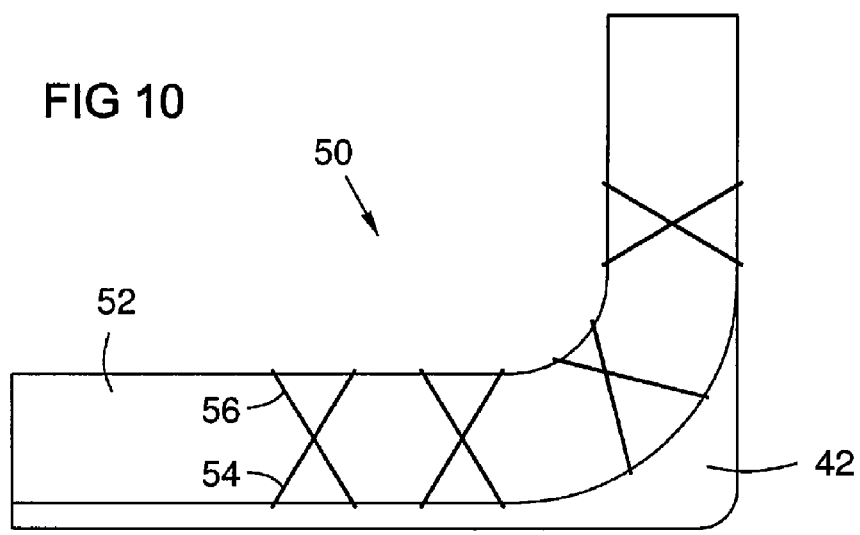
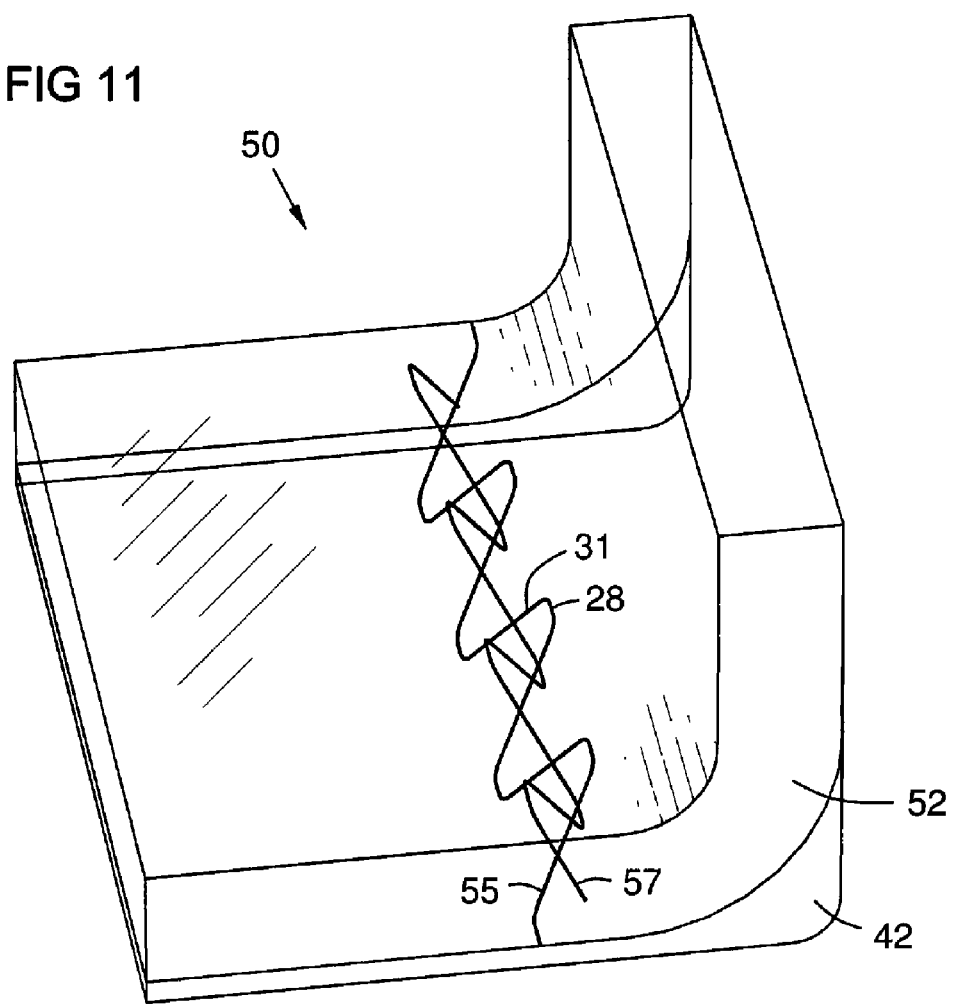

CERAMIC MATRIX COMPOSITE WALL WITH POST LAMINATE STITCHING

FIELD OF THE INVENTION

This invention relates to ceramic matrix composite (CMC) walls formed of laminated sheets of ceramic fibers, and particularly to interlaminar reinforcement methods and mechanisms for such walls.

BACKGROUND OF THE INVENTION

Ceramic matrix composites (CMC) are used for components in high-temperature areas of gas turbines. CMC walls may be formed by laminating multiple layers of ceramic fabric or fibers in a ceramic matrix. However, interlaminar stresses work to damage the interlayer bonds and separate the layers. Alternately, three-dimensionally woven CMC walls offer improved through-thickness properties over 2D laminated walls. 3D walls are reinforced at the preform stage, during which a ceramic fiber structure is woven to nearly final shape by weaving, braiding, or knitting. However, this technique is not feasible for oxide-based CMCs without considerable investment, because infiltrating a particulate loaded ceramic slurry into a thick, tightly packed, brittle fiber preform is extremely difficult. It can result in incomplete and heterogeneous matrix infiltration, even when using state-of-the-art processing, and even for relatively thin 3D preforms such as 3-4 mm. The problem is worse with more realistic component wall thicknesses such as 5 mm or more. U.S. Pat. Nos. 4,568,594, 4,888,311, 4,921,822, 5,077,243, 5,294,387, 5,306,554, and 5,460,637 teach oxide matrix CMCs in which the largest matrix particles are preferred to be greater than 1 micron in diameter. This size is taught as preferable both for sintering shrinkage control and high temperature stability. However, these large particle sizes are especially difficult to infiltrate into a thick, densely packed fibrous preform, because the preform acts as a filter. All of the above patents also teach bimodal particle size distributions including a smaller size range much less than 1 micron. The smaller particles infiltrate nicely, but they are segregated from the larger particles via the filtration effect.

In addition, 3D preforms have the following constraints:
- Limited to simple shapes such as extruded, flat, or cylindrical, depending on production method
- Not conducive to localized optimization of reinforcement geometry
- High development costs for complex shapes, due to custom loom setups, etc.
- 3D preforms often cannot be compacted for maximum fiber volume without losing the through-thickness reinforcement benefit
- Long development time & expense precludes iterative design approaches
- Expertise resides in a limited number of specialty shops, none of which offer all available options.

BRIEF DESCRIPTION OF THE DRAWINGS

The invention is explained in the following description in view of the drawings that show:

FIG. 4 is a sectional view of a CMC wall formed of layers with interlaminar reinforcement stitching with surface loops anchoring a thermal barrier layer.

FIG. 5 is a sectional view of a CMC airfoil with reinforcement stitching angles varying by local stress type.

FIG. 10 is a front transparent view as in FIG. 7 with optional additional pairs of stitching rows around an edge of the ring segment.

FIG. 11 is a perspective transparent view of an edge portion of a gas turbine shroud ring segment with two overlapping rows of doubly angled stitching to resist interlaminar shear at any angle.

DETAILED DESCRIPTION OF THE INVENTION

The invention provides selective through-thickness reinforcement applied to a CMC laminated wall after the laminae are stacked and partially or fully cured. Holes may be formed in the wall after at least partial curing, and a ceramic fiber thread is passed through the holes to form a row of stitches. The thread is infiltrated with a wet ceramic matrix before or after stitching, and then heated/cured after stitching. The ceramic fibers and matrix of the thread shrink during firing, thus creating a tensile preload in the stitches. Selection of a firing temperature for the CMC wall, and selection of the type of thread fiber determines the amount of tensile preload created.

For example, bisque firing of the CMC wall can partially shrink the wall in order to leave a remaining shrinkage approximately equal to the full shrinkage of a thermal barrier coating (TBC) during a final curing. The present stitching may be done after the bisque firing and before applying the TBC. If wet stitching is done on a bisque-fired CMC laminate, shrinkage of the thread fibers and thread matrix can be greater than that of the bisque-fired laminate during final curing, thus imparting tension on the stitching. This provides a corresponding through-thickness compression on the laminate. Holes in the CMC wall for the stitches may be formed using means such as laser or water jet cutting, or the holes may be formed by using either fugitive or removable pins. For example, holes may be formed in the wet lay-up stage by insertion of pins or rods through the wet preform (e.g., through apertures in the tooling). The pins may be removed following drying and partial cure of the laminate and prior to bisque firing. Holes with diameters less than 1 mm in diameter have been shown to have little effect on in-plane properties in CMC walls, which are relatively notch-insensitive. Larger diameter holes are also possible, but the resultant in-plane strength debits would have to be accounted for.

A weaving thread 25 may comprise a single tow or multiple tows of fibers. For example, a single tow or bundle of fibers may have a cross section of about 0.5 mm in a circular cross section. In another example it may be 1 mm wide by 0.25 mm thick. A thread 25 may be on the order of the ply thickness or larger. Multiple tows may be used to form larger threads. These example dimensions are not intended to be limiting.

Figure 1:
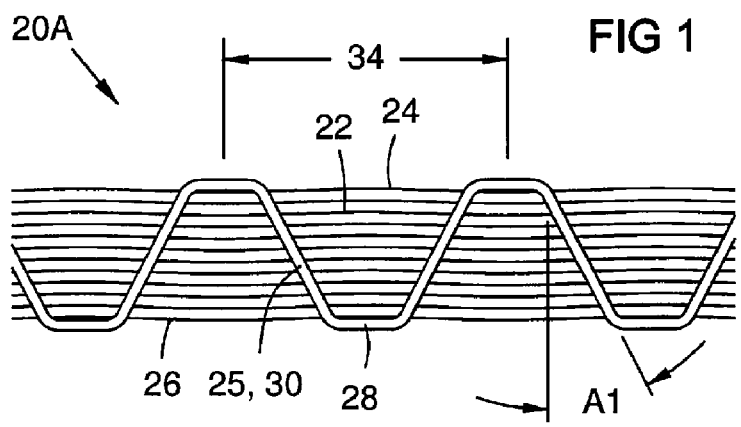
FIG. 1 is a sectional view of a CMC wall formed of layers with interlaminar reinforcement stitching in a first geometry.

FIG. 1 shows a reinforced CMC wall 20A formed of laminated ceramic fiber sheets 22. The wall 20A has first and second exterior surfaces 24, 26. A ceramic fiber thread 25 has surface-spanning portions 28, oblique through-wall portions 30, and a stitch direction and length 34. Herein "oblique" means neither parallel nor perpendicular to a CMC wall surface plane, or to a tangent plane in the case of a curved wall surface. "More oblique" means more divergent from perpendicular to the CMC wall surface plane or tangent plane. Angle A1 illustrates an angle of divergence of a through-wall portion 31 of a stitch from a line perpendicular to the CMC wall surface plane or tangent plane along the row of stitches. Oblique stitching as in FIG. 1 resists interlaminar shear in the stitch direction 34.

Figure 2:
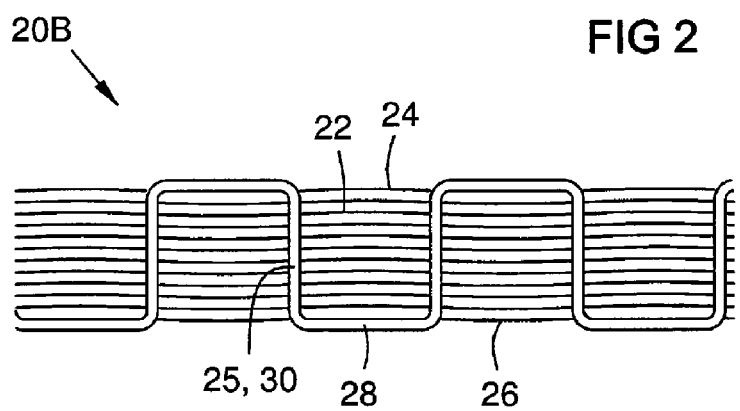
FIG. 2 is a sectional view of a CMC wall formed of layers with interlaminar reinforcement stitching in a second geometry.

FIG. 2 shows a reinforced CMC wall 20B formed of laminated ceramic fiber sheets 22. The wall 20B has first and second exterior surfaces 24, 26. A ceramic fiber thread 25 has surface-spanning portions 28, and perpendicular through-wall portions 30. Perpendicular stitching as in FIG. 2 resists interlaminar tension or separation.

Figure 3:
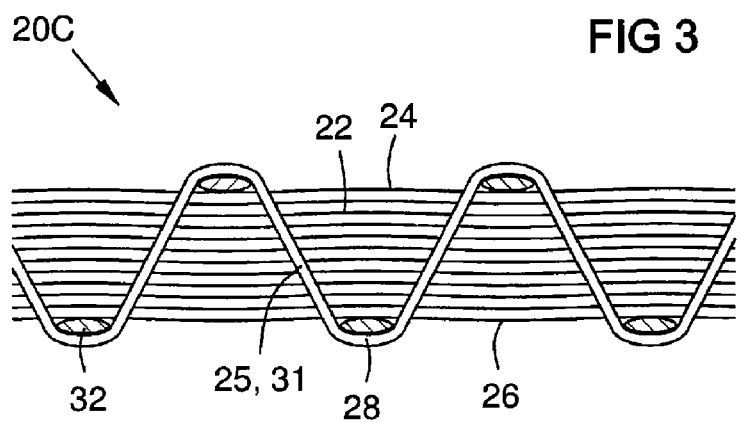
FIG. 3 is a sectional view of a CMC wall formed of layers with interlaminar reinforcement stitching and surface pads.

FIG. 3 shows a reinforced CMC wall 20C formed of laminated ceramic fiber sheets 22. The wall 20C has first and second exterior surfaces 24, 26. A ceramic fiber thread 25 has surface-spanning portions 28, and oblique through-wall portions 30. Pads or bars 32 under the surface-spanning portions 28 distribute stress between the thread 28 and the surface 22, 24. The pads 32 may also provide gripping surfaces for any applied thermal barrier coating (not shown) on the first surface 24 and/or any ceramic backing or core (not shown) on the second surface 26. The pads may also serve to increase the local bending radius of the stitching fibers to minimize stress concentrations due to bending. The pads 32 may be ceramic or CMC.

FIG. 4 shows a reinforced CMC wall 20D formed of laminated ceramic fiber sheets 22. The wall 20D has first and second surfaces 24, 26. A ceramic fiber thread 25 has surface-spanning portions 27, 28, and oblique through-wall portions 30. The surface-spanning portions 27 on the first wall surface 24 are formed as loops during stitching. Then a wet ceramic thermal barrier coating 42 is applied and flows through and under the loops and between the thread 25 and the fiber sheets 22. During final curing, the loops 27 anchor the thermal barrier coating. Shrinkage of the thread creates a preloaded connection between the wall and the TBC. Pads or bars 32 are shown under the surface-spanning portions 28 of the thread 25 on the second wall surface 26. This distributes stress between the thread 28 and the wall surface 26. One may appreciate that the pads or bars may also be used on surface 24 in conjunction with coating 42.

FIG. 5 shows a hollow CMC airfoil 40 with a wall formed of laminated ceramic fiber sheets 22 with a thermal barrier coating 42. The airfoil 40 has a leading edge 43, a trailing edge 44, a pressure side 45, and a suction side 46. In this example, it may be assumed that the leading and trailing edges experience mostly interlaminar tension, while the pressure and suction sides experience mostly or largely interlaminar shear. The through-wall portions 30 of the stitches 25 vary from substantially normal to the lamina 22 at the leading and trailing edges to oblique at the pressure and suction sides of the airfoil. This provides local optimization of reinforcement.

With a varying stitch geometry such as in FIG. 5, each through-wall portion 30 of a stitch may have an angle that departs from a line normal to the CMC wall as a function of the ratio of interlaminar shear over interlaminar tension, up to a maximum angle A1 such as 60 degrees, for example. Thus, a stitch that resists mainly interlaminar tension has approximately perpendicular through-wall portions, and a stitch geometry that resists largely interlaminar shear has oblique through-wall portions.

In FIG. 5 the stitches 28, 30 may follow a path around the leading edge 43 generally transverse to a span of the airfoil 40. The trailing edge 44 shows a similar geometry for a first row of stitches 25. In addition, a second row of the stitches 33, shown as a dashed line, follows a path approximately parallel to that of the first row of stitches 25. Each stitch of the second row 33 is offset from each respective stitch of the first row 25 by approximately 50% of each respective stitch length. In other words, the peaks of the second row are adjacent to the valleys of the first row. Such alternating rows of stitches may be placed all along the span of the airfoil. Alternatively, the lines of stitches may be oriented along the span. This is particularly useful if the leading or trailing edges require perpendicular through-wall stitches.

Figure 6:
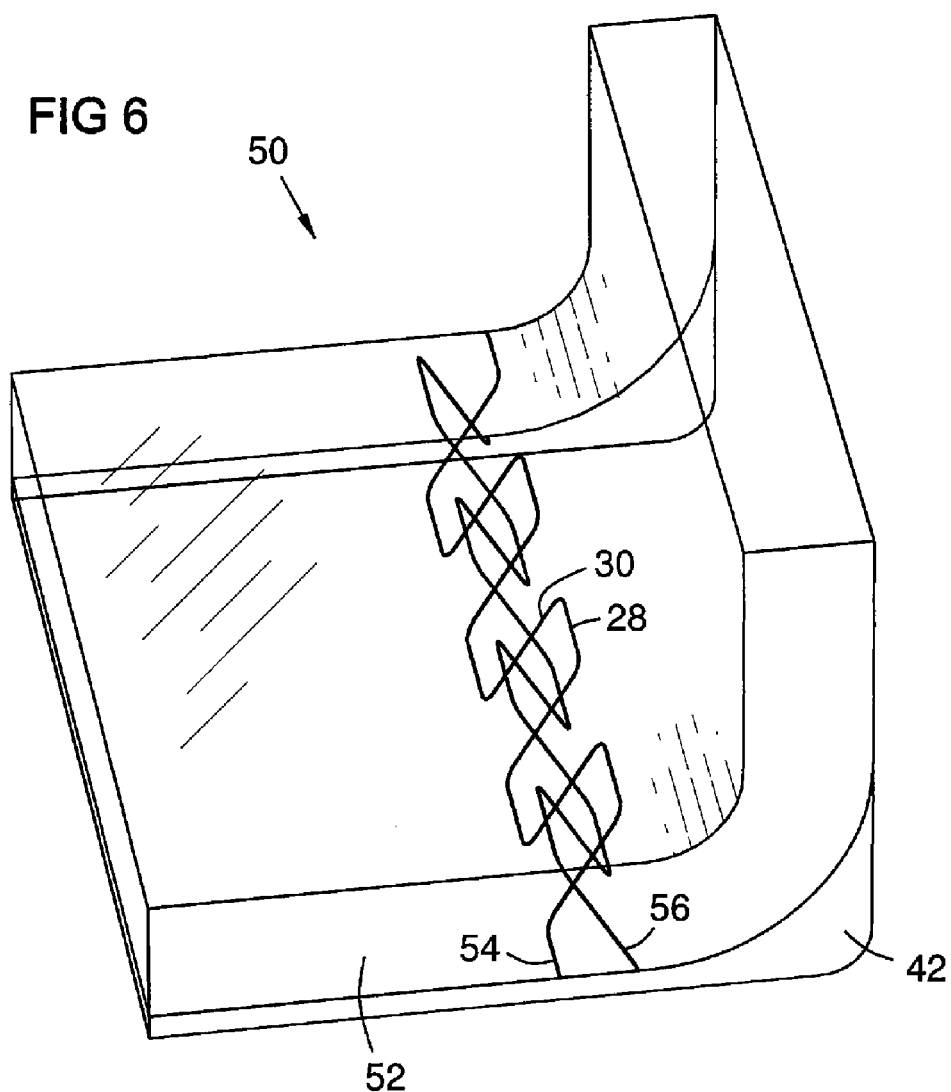
FIG. 6 is a perspective transparent view of an edge portion of a gas turbine shroud ring segment with two overlapping rows of stitching angled to resist interlaminar shear.

FIG. 6 shows an edge portion of a CMC shroud ring segment 50, with first 54 and second 56 rows of stitches, each stitch having a surface-spanning portion 28 and a through-wall portion 30. A thermal barrier layer 42 is shown on the ring segment 50 as known in the art. The first row of stitches 54 resides substantially in a first stitching plane 60 (FIG. 7) that is oblique to the wall structure 52. The second row of stitches 56 resides in a second stitching plane 62 that is substantially a mirror image of the first stitching plane across a mirror plane 64 normal to the wall structure and parallel to the first row. Each stitch of the first row 54 is offset from each respective stitch of the second row 56 in the stitch direction by approximately 25% of each respective stitch length. This allows the two rows of stitches to overlap without intersecting threads. Angle A2 (FIG. 7) illustrates an angle of a stitching plane 62 relative to the mirror plane 64.

Figure 7:
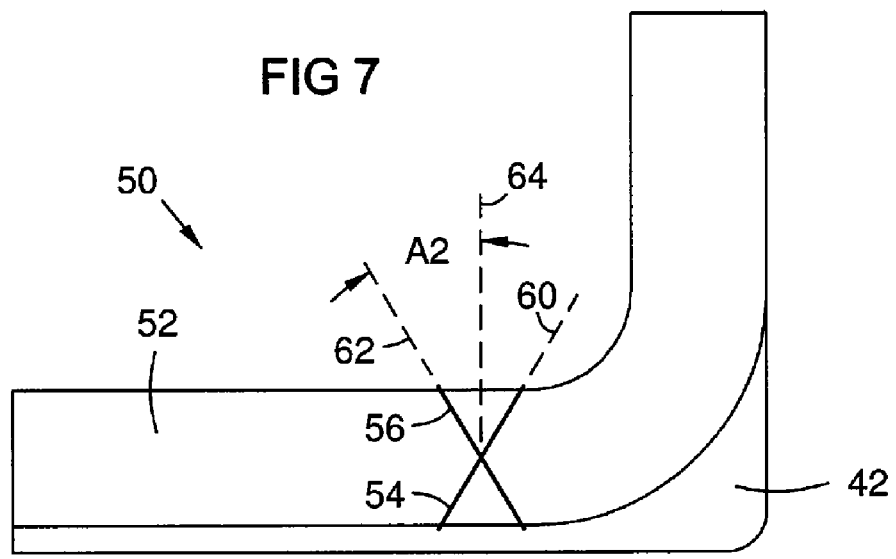
FIG. 7 is a front transparent view of FIG. 6.
Figure 8:
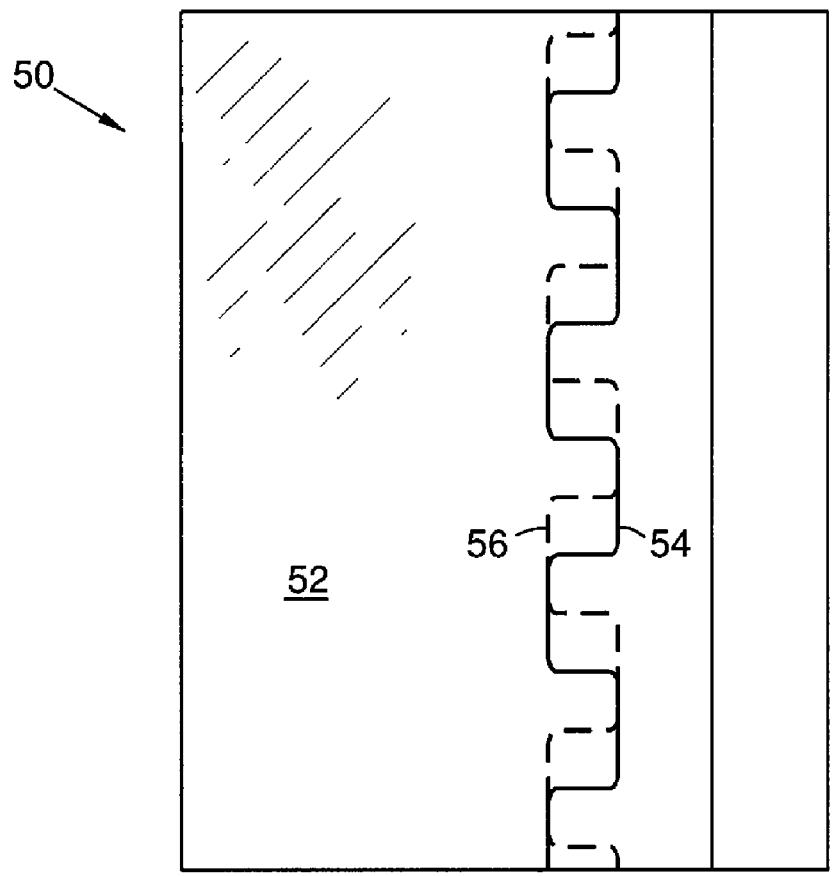
FIG. 8 is a top transparent view of FIG. 6. One row of stitches is dashed to distinguish it visually from the other row.
Figure 9:
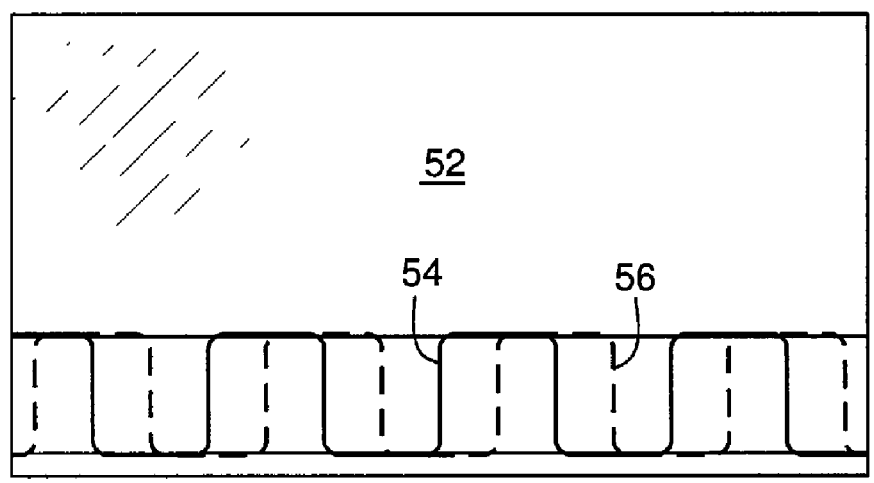
FIG. 9 is a left side transparent view of FIG. 6. One row of stitches is dashed to distinguish it visually from the other row.

FIGS. 8 and 9 show top and left side views of FIG. 6. The second row of stitches 56 is dashed for visual clarity. FIG. 10 shows a view as in FIG. 7 with additional pairs of stitching rows. The stitch geometry of FIGS. 6-10 especially resists interlaminar shear perpendicular to an edge of the ring segment.

FIG. 11 shows a stitch geometry similar to that of FIG. 6, except that each stitch has wall-crossing portions 31 that are oblique to wall spanning portions 28 within the stitch plane 60, 62 in addition to having oblique stitching planes 60, 62. Each stitch of the first row 55 is offset from each respective stitch of the second row 57 by approximately 25% of each respective stitch length, allowing the two rows of stitches to overlap without intersecting threads. This stitch geometry resists interlaminar shear in all directions.

A CMC wall formed of laminated ceramic fiber sheets made of a mullite-based fiber, such as the alumina-rich mullite fibers sold under the trademark Nextel™ 720 may be stitched with fibers having a higher alumina content fiber, for example Nextel™ 610 or Nextel™ 650 fibers. While the higher alumina content Nextel™ 610 and Nextel™ 650 fibers have lower strength at temperature and experience more rapid grain growth and strength degradation than Nextel™ 720 fibers, even in their degraded form they offer much greater strength than the through-thickness matrix-dominated CMC laminate. While such higher alumina fibers may degrade somewhat on the surface of the wall, which is the hottest portion of the structure, the subsurface properties will be affected to a much lesser degree. Interlaminar shear and tensile stressed tend to peak at mid-thickness (e.g. interlaminar tension is zero at the free surfaces) where the stitching fibers are maintained at a more moderate temperature. Thus, the somewhat lower temperature capability fibers with higher alumina content can be used effectively. Advantageously, the higher alumina Nextel™ 610 or Nextel™ 650 fibers experience greater shrinkage at typical CMC firing temperatures, thereby resulting in greater prestress potential. Such fibers also have a higher coefficient of thermal expansion, resulting in greater prestress at ambient temperature or any temperature less than the sintering temperature. These fibers also have higher thermal conductivity, resulting in improved laminate through-thickness conductivity and lower temperature gradients and thermal stresses. They are also more amenable to tight radius stitching.

The formula below can be applied to angle A1 as in FIG. 1 and/or to angle A2 as in FIG. 7 or to both A1 and A2 independently for different shear directions as in FIG. 11.

$$A=(S/T)*C$$

where:
A is Angle A1 and/or A2, limited to a given maximum
S is Interlaminar shear in the direction of the angle A1 or A2
T is Interlaminar tension (perpendicular tension between lamina)
C is a Constant, such as 10, or a variable or function
Benefits of the invention include:
Selective reinforcement in areas of high stress only
Stitch geometry can be optimized for each local wall area differently.
Avoids high development cost of 3D fiber preforms and tooling.
Allows matrix infiltration of each thin lamina individually, avoiding problematic and expensive thick-wall infiltration for 3D preforms.
Preloads CMC walls with through-thickness compression.
Not limited by looms and textile machinery.
Experimentation can be performed within a testing laboratory with rapid feedback for iterative design.
Stitch fibers on CMC surfaces add grip for thermal barrier coatings and ceramic backings or cores.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of forming a ceramic composite matrix (CMC) wall comprising:
creating a plurality of sheets of ceramic fibers;
infusing the sheets of ceramic fibers with a first wet ceramic matrix;
stacking the infused sheets to form a laminated CMC wall with first and second opposed exterior surfaces;
forming a row of holes through the laminated CMC wall;
at least partially curing the laminated CMC wall by a first heating;
infusing a thread of ceramic fibers with a second wet ceramic matrix;
passing the thread of ceramic fibers through the holes to form a row of CMC stitches through the laminated CMC wall, each stitch comprising a surface-spanning portion on both the first and the second opposed exterior surfaces of the laminated CMC wall, a through-wall portion, and a stitch direction; and
curing the infused thread of ceramic fibers by a second heating that shrinks the CMC stitches relative to the laminated CMC wall, tensioning the CMC stitches;
wherein the stitches resist interlaminar separation in the laminated CMC wall;
wherein each through-wall portion forms an oblique angle with a line perpendicular to the laminated CMC wall, wherein said oblique angle is a function of a ratio of interlaminar shear over interlaminar tension at a location of each stitch; and
wherein the laminated CMC wall forms an airfoil comprising a leading edge, a trailing edge, a pressure side, and a suction side, and wherein the through-wall portions of the stitches vary from less oblique or normal to the laminated CMC wall at the leading and trailing edges to more oblique at the pressure and suction sides of the airfoil.

2. The method of claim 1, further comprising providing a ceramic pad between the surface-spanning portion and the first surface of the laminated CMC wall, wherein the surface-spanning portion and the ceramic pad on the first surface of the laminated CMC wall provide gripping surfaces for a thermal barrier coating thereon.

3. The method of claim 1, wherein the stitches form first and second generally parallel rows of stitches, and each stitch of the first row is offset from each respective stitch of the second row by approximately 50% of each respective stitch length in the stitch direction.

4. The method of claim 1, wherein the stitches form a first and a second row of stitches, wherein the second row of stitches follows a path approximately parallel to that of the first row of stitches, and wherein each stitch of the second row is offset from each respective stitch of the first row by approximately 50% of each respective stitch length in the stitch direction.

5. The method of claim 1, wherein the holes are formed in a wet lay-up stage of a preform of the laminated CMC wall by inserting pins through the wet preform, then drying and partially curing the preform, then removing the pins, then bisque firing the preform.

6. The method of claim 1, further comprising placing the laminated CMC wall into through-thickness compression via differential sintering shrinkage of the laminated CMC wall relative to the stitches by selecting a pre-sintering temperature for the laminated CMC wall that partially shrinks the laminated CMC wall prior to stitching.

7. The method of claim 1, further comprising placing the laminated CMC wall into through-thickness compression via differential sintering shrinkage of the laminated CMC wall relative to the stitches by selecting a material for the thread that has a higher shrinkage than that of the laminated CMC wall.

8. A method of forming a ceramic composite matrix (CMC) wall comprising:
creating a plurality of sheets of ceramic fibers;
infusing the sheets of ceramic fibers with a first wet ceramic matrix;
stacking the infused sheets to form a laminated CMC wall with first and second opposed exterior surfaces;
forming a row of holes through the laminated CMC wall;
at least partially curing the laminated CMC wall by a first heating;
infusing a thread of ceramic fibers with a second wet ceramic matrix;
passing the thread of ceramic fibers through the holes to form a row of CMC stitches through the laminated CMC wall, each stitch comprising a surface-spanning portion on both the first and the second opposed exterior surfaces of the laminated CMC wall, a through-wall portion, and a stitch direction; and curing the infused thread of ceramic fibers by a second heating that shrinks the CMC stitches relative to the laminated CMC wall, tensioning the CMC stitches;

wherein the stitches resist interlaminar separation in the laminated CMC wall;

wherein each through-wall portion forms an angle with a line perpendicular to the laminated CMC wall, wherein said angle is proportional to a ratio of interlaminar shear over interlaminar tension at a location of each stitch; and wherein the laminated CMC wall forms an airfoil with an outer curved surface comprising a leading edge, a trailing edge, a pressure side, and a suction side, wherein the first exposed exterior surface of the laminated CMC wall forms the outer curved surface of the airfoil, the sheets are parallel to the outer curved surface of the airfoil, and wherein the through-wall portions of the stitches vary from less oblique or normal to the laminated CMC wall at the leading and trailing edges to more oblique at the pressure and suction sides of the airfoil.

9. The method of claim 8, further comprising providing a ceramic pad between the surface-spanning portion and the first surface of the laminated CMC wall, wherein the surface-spanning portion and the ceramic pad on the first surface of the laminated CMC wall provide gripping surfaces for a thermal barrier coating thereon.

10. The method of claim 8, wherein the stitches form a first and a second row of stitches, wherein the second row of stitches follows a path approximately parallel to that of the first row of stitches, and wherein each stitch of the second row is offset from each respective stitch of the first row by approximately 50% of each respective stitch length in the stitch direction.

11. The method of claim 8, further comprising placing the laminated CMC wall into through-thickness compression via differential sintering shrinkage of the laminated CMC wall relative to the stitches by selecting a pre-sintering temperature for the laminated CMC wall that partially shrinks the laminated CMC wall prior to stitching.

12. The method of claim 8, further comprising placing the laminated CMC wall into through-thickness compression via differential sintering shrinkage of the laminated CMC wall relative to the stitches by selecting a material for the thread that has a higher shrinkage than that of the laminated CMC wall.

13. The method of claim 8, wherein said angle is proportional to the ratio of interlaminar shear over interlaminar tension in the stitch direction at the location of each stitch.

* * * * *